(12) United States Patent
Mori

(10) Patent No.: US 9,376,154 B2
(45) Date of Patent: Jun. 28, 2016

(54) VEHICLE

(71) Applicant: TOYOTA JIDOSHA KABUSHIKI KAISHA, Toyota-shi, Aichi-ken (JP)

(72) Inventor: Makoto Mori, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/601,987

(22) Filed: Jan. 21, 2015

(65) Prior Publication Data

US 2015/0210337 A1 Jul. 30, 2015

(30) Foreign Application Priority Data

Jan. 28, 2014 (JP) ................. 2014-013365

(51) Int. Cl.
*B62K 17/00* (2006.01)
*B62K 3/00* (2006.01)
*B62D 51/00* (2006.01)
*B62D 51/02* (2006.01)
*B62K 3/06* (2006.01)

(52) U.S. Cl.
CPC .............. *B62K 3/007* (2013.01); *B62D 51/001* (2013.01); *B62D 51/02* (2013.01); *B62K 3/06* (2013.01)

(58) Field of Classification Search
CPC ........ B62K 3/007; B62K 3/06; B62D 51/001; B62D 51/02
See application file for complete search history.

(56) References Cited

U.S. PATENT DOCUMENTS

| | | | | |
|---|---|---|---|---|
| 6,732,823 B2* | 5/2004 | Furuta | ................. | B62B 3/10 180/19.2 |
| 6,907,949 B1* | 6/2005 | Wang | ................. | B62D 51/02 180/19.1 |
| 7,192,040 B2* | 3/2007 | Xie | ................. | B62D 51/001 180/216 |
| 7,740,099 B2* | 6/2010 | Field | ................. | A63C 17/01 180/282 |
| 8,523,224 B2* | 9/2013 | Gallagher | ............. | B62B 3/0612 280/748 |
| 8,606,468 B2* | 12/2013 | Kosaka | .................. | A63C 17/12 180/219 |
| 8,626,399 B2* | 1/2014 | Takeuchi | ............... | B62K 3/007 701/49 |
| 9,037,331 B2* | 5/2015 | Taira | ................. | B62K 3/007 180/6.28 |
| 9,114,849 B2* | 8/2015 | Choppla | .................. | B62M 1/36 |
| 9,272,589 B2* | 3/2016 | Yamano | .................. | B60D 1/00 |
| 2003/0160510 A1 | 8/2003 | Mizutani et al. | | |
| 2004/0102166 A1 | 5/2004 | Morita et al. | | |
| 2010/0250040 A1* | 9/2010 | Yamano | ................. | B62K 3/007 701/22 |
| 2012/0158208 A1* | 6/2012 | Kawamoto | ............. | B62K 3/007 701/1 |
| 2012/0323450 A1 | 12/2012 | Takeuchi et al. | | |

FOREIGN PATENT DOCUMENTS

JP  2003-254208 A  9/2003
JP  2004-200986 A  7/2004

(Continued)

*Primary Examiner* — Nicole Verley

(74) *Attorney, Agent, or Firm* — Oliff PLC

(57) ABSTRACT

A vehicle capable of preventing the vehicle from making any movement that is not intended by a rider without performing any complicated control is provided. A vehicle includes a step plate on which a rider puts his/her feet to get on the vehicle, and a handle that extends upward from a front of the step plate and is grasped by the rider, the vehicle being configured to move by performing inversion control, in which the vehicle further includes a power-on operation section for instructing the vehicle to at least start the inversion control, the starting operation section being disposed on a surface on the side opposite to a step plate side of the handle.

5 Claims, 14 Drawing Sheets

(56) References Cited

FOREIGN PATENT DOCUMENTS

| JP | 2005-335570 A | 12/2005 | | |
| JP | 2011-031793 A | 2/2011 | | |
| JP | 2012-240484 A | 12/2012 | | |
| JP | 5151779 B2 * | 2/2013 | .............. | B62J 25/00 |
| JP | WO 2014033789 A1 * | 3/2014 | ............. | B62K 3/007 |
| JP | 2014-187598 A | 10/2014 | | |
| RU | WO 2012047127 A1 * | 4/2012 | .............. | B62K 1/00 |

* cited by examiner

VEHICLE

INCORPORATION BY REFERENCE

This application is based upon and claims the benefit of priority from Japanese patent application No. 2014-13365, filed on Jan. 28, 2014, the disclosure of which is incorporated herein in its entirety by reference.

BACKGROUND OF THE INVENTION

1. Field of the Invention

The present invention relates to a vehicle.

2. Description of Related Art

In a vehicle including a handle, which is grasped by a rider, and a riding section, on which the rider rides, an operating unit for powering on the vehicle is usually disposed on a surface of the handle located on the riding section side (i.e., a surface on the rear side of the handle) (hereinafter simply expressed as "surface on the riding section side of the handle"). For example, Japanese Unexamined Patent Application Publication No. 2004-200986 discloses a vehicle in which a key hole for the main switch is disposed on a surface on the riding section side of the handle.

As shown in FIG. 11, the handle of an inverted two-wheeled vehicle 400 includes, for example, a first support section 401 extending from the front part of a riding section 405, a second support section 402 extending from the top of the first support section 401 upward and toward the back of the inverted two-wheeled vehicle 400, and a grasping section 403 protruding from the upper part of the second support section 402 upward and toward the front of the inverted two-wheeled vehicle 400, Further, in this handle, a push button 404 for powering on the inverted two-wheeled vehicle 400 is disposed on a surface on the riding section 405 side of the second support section 402. Further, as shown in Fig, 12, usually, a rider X first presses down this push button 404 to turn on the power and then he/she gets on the inverted two-wheeled vehicle 400.

However, the present inventors have found the following problems. For example, when the inverted two-wheeled vehicle 400 is in a power-off state and a rider X presses down the push button 404 while jumping onto the inverted two-wheeled vehicle 400 as shown in FIG. 13, there is a possibility that the inversion control of the inverted two-wheeled vehicle 400 will not be able to cope with the momentum and the posture of the rider X, who has just jumped on the inverted two-wheeled vehicle 400, because the inverted two-wheeled vehicle 400 is still in the process of starting the inversion control. In this case, there is a possibility that the inverted two-wheeled vehicle 400 will not be able to restore its posture and eventually fall down.

Further, for example, when the inverted two-wheeled vehicle 400 is in a power-off state and a rider X presses down the push button 404 while jumping onto the inverted two-wheeled vehicle 400 as shown in FIG. 14, there is a possibility that the rider's press-down action will be insufficient and the inverted two-wheeled vehicle 400 will remain in the power-off state. In this case, there is a possibility that the inverted two-wheeled vehicle 400 will fall down because the inversion control of the inverted two-wheeled vehicle 400 has not been started.

In order to be sure to prevent the inverted two-wheeled vehicle from falling down because of the above-described states where the rider gets on the inverted two-wheeled vehicle before the inversion control has been started, it is necessary to implement complicated control in the inverted two-wheeled vehicle. However, to begin with, such complicated control cannot be performed when the inverted two-wheeled vehicle is in the power-off state.

SUMMARY OF THE INVENTION

The present invention has been made to solve the above-described problems, and an object thereof is to provide a vehicle capable of preventing the vehicle from making any movement that is not intended by a rider without having to perform any complicated control.

A first exemplary aspect of the present invention is a vehicle including a riding section on which a rider puts his/her feet to get on the vehicle, and a handle that extends upward from a front of the riding section and is grasped by the rider, the vehicle being configured to move by performing inversion control. Further, the vehicle further incudes a starting operation section for instructing the vehicle to at least start the inversion control, the starting operation section being disposed on a surface on the side opposite to a riding section side of the handle.

According to the first aspect of the present invention, the starting operation section, which is used to instruct the vehicle to start the inversion control, is provided on a surface on the side opposite to the riding section side of the handle. Therefore, a rider cannot easily operate the starting operation section from the riding section side. Consequently, the rider first starts the inversion control of the vehicle by operating the starting operation section from the side opposite to the riding section side of the vehicle, and then moves to the riding section side of the vehicle and gets on the vehicle. As a result, it is possible to prevent the rider from getting on the vehicle before the inversion control of the vehicle is started. Therefore, it is possible to prevent the vehicle from making any movement that is not intended by the rider without having to perform any complicated control.

A vehicle capable of preventing the vehicle from making any movement that is not intended by a rider without having to perform any complicated control can be provided.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

Figure 1:
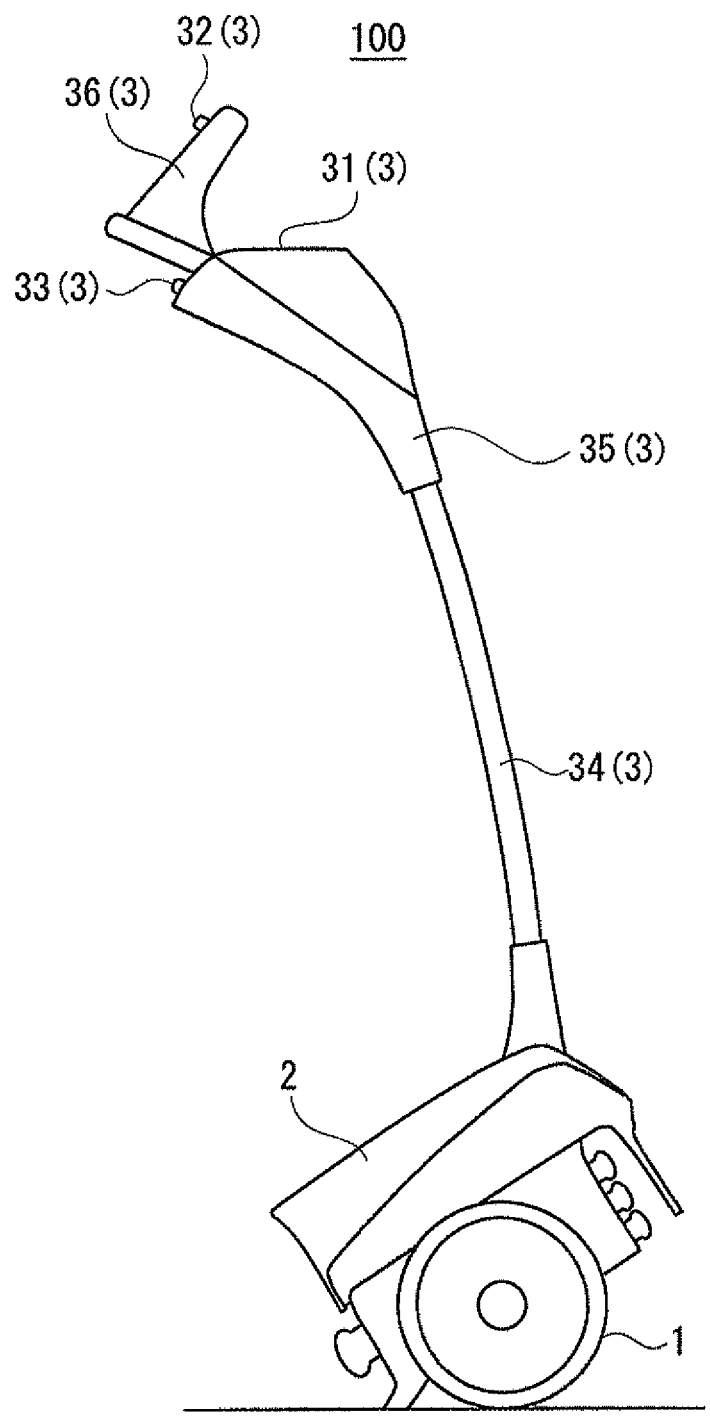
FIG. 1 is a side view showing an inverted two-wheeled vehicle according to a first exemplary embodiment of the present invention.

A first exemplary embodiment according to the present invention is explained hereinafter with reference to the drawings. FIG. 1 is a side view showing a general configuration of an inverted two-wheeled vehicle (vehicle) 100 according to a first exemplary embodiment of the present invention. Specifically, FIG. 1 shows a side of the inverted two-wheeled vehicle 100 in a parked state.

As shown in FIG. 1, the inverted two-wheeled vehicle 100 includes two wheels 1, a step plate(s) (riding section) 2, a handle 3, and so on.

The step plate 2 is disposed between the coaxially-arranged two wheels 1. A rider X puts his/her feet on the step plate 2 to get on the inverted two-wheeled vehicle 100.

The handle 3 is disposed so as to extend upward from the front part of the step plate 2, and is grasped by the rider X.

Further, the inverted two-wheeled vehicle 100 includes a control apparatus (not shown) and its inverted state is controlled by the control apparatus.

Figure 2:
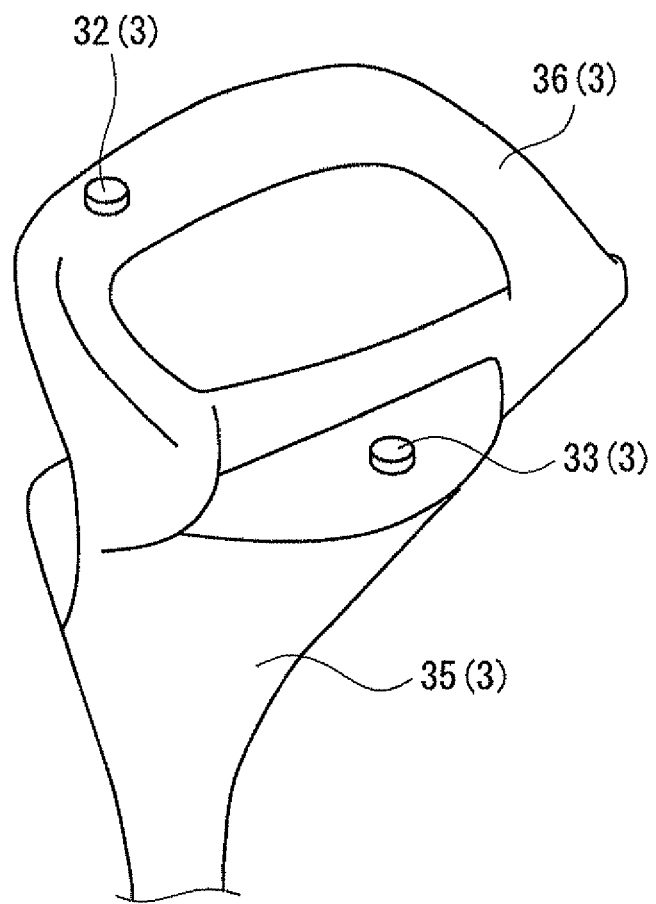
FIG. 2 is a perspective view showing a handle of the inverted two-wheeled vehicle according to the first exemplary embodiment of the present invention.
Figure 3:
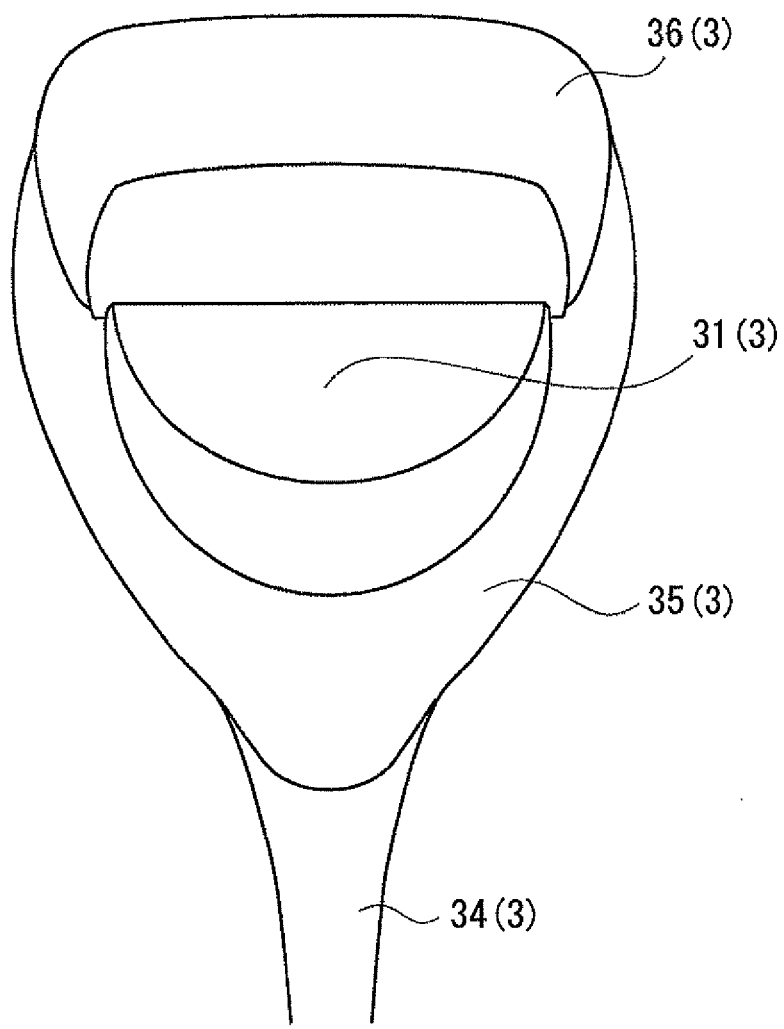
FIG. 3 is a front view showing the handle of the inverted two-wheeled vehicle according to the first exemplary embodiment of the present invention.

FIGS. 2 and 3 are magnified views of the upper part of the handle 3. As shown in FIGS. 2 and 3, the handle 3 includes a power-on operation section (starting operation section) 31 for powering on the inverted two-wheeled vehicle 100, a getting-off button 32, a power-off button (stopping operation section) 33 for powering off the inverted two-wheeled vehicle 100, and so on. Note that when the rider X presses down the power-on operation section 31, the control apparatus of the inverted two-wheeled vehicle 100 is instructed to at least start the inversion control. Further, when the rider X presses down the power-off button 33, the control apparatus of the inverted two-wheeled vehicle 100 is instructed to at least stop the inversion control.

Further, as shown in FIGS. 1 to 3, the handle 3 includes a first support section (support section) 34, a second support section (support section) 35, a grasping section 36, and so on.

The first support section 34 is a stick-like member and extends upward from the step plate 2.

The second support section 35 extends from the top of the first support section 34 upward and toward the back of the inverted two-wheeled vehicle 100. Further, the second support section 35 has a width wider than that of the first support section 34. Specifically, the second support section 35 extends upward from the top of the first support section 34 and has a roughly triangular shape.

The grasping section 36 protrudes from the upper part of the second support section 35 upward and toward the front of the inverted two-wheeled vehicle 100. Further, the grasping section 36 has a roughly U-shape. The grasping section 36 is a section which is grasped by the rider X riding on the inverted two-wheeled vehicle 100 with his/her hand(s). Further, the grasping section 36 may be equipped with various buttons for instructing the inverted two-wheeled vehicle 100 to perform various movements as well as the getting-off button 32 (which is described later).

The power-on operation section 31 is an electronic lock authentication device capable of communicating with a wireless communication terminal (not shown) by short-range radio communication (or near field communication). Specifically, the power-on operation section 31 first acquires authentication data stored in the wireless communication terminal through short-range radio communication. Next, the power-on operation section 31 determines whether or not the electronic lock should be opened/closed based on whether or not this authentication data matches authentication data stored in the power-on operation section 31. In other words, the power-on operation section 31 unlocks the electronic lock when the authentication data acquired from the wireless communication terminal matches the authentication data stored in the power-on operation section 31. On the other hand, when the authentication data acquired from the wireless communication terminal does not match the authentication data stored in the power-on operation section 31, the power-on operation section 31 does not unlock the electronic lock. Then, the power-on operation section 31 powers on the inverted two-wheeled vehicle 100 when the power-on operation section 31 unlocks the electronic lock.

Note that the wireless communication terminal is a device that the rider X possesses. For example, the wireless communication terminal may be a smartphone or the like.

Further, the power-on operation section 31 and the wireless communication terminal establish a connection such as Wifi, Bluetooth (registered trademark), or the like between them, and perform bidirectional communication.

Note that the authentication data stored in the power-on operation section 31 may be stored in the above-described control apparatus. In this case, the control apparatus may determine whether or not the acquired authentication data matches the stored authentication data and thereby determine whether or not the electronic lock should be opened/closed.

Further, the power-on operation section 31 is disposed on a surface of the handle 3 located on the side opposite to the step plate 2 side (i.e., a surface on the front side of the handle 3) (hereinafter simply expressed as "surface on the side opposite to the step plate 2 side of the handle 3"). Specifically, the power-on operation section 31 is disposed on a surface that is located on the side opposite to the step plate 2 side of the second support section 35 and located below the grasping section 36. More specifically, the power-on operation section 31 is disposed so as to protrude from the second support section 35 downward and toward the front of the inverted two-wheeled vehicle 100 below the grasping section 36. Further, the top surface of the power-on operation section 31 is formed so that the wireless communication terminal can be held over that top surface. Further, when the rider X holds the wireless communication terminal over the top surface of the power-on operation section 31, short-range radio communication is initiated between the power-on operation section 31 and the wireless communication terminal. Note that the surface of the power-on operation section 31 over which the wireless communication terminal is held may be the front surface of the power-on operation section 31.

Further, the place where the power-on operation section 31 is disposed is not limited to the above-described place explained in regard to the first exemplary embodiment. That is, the only requirement is that the power-on operation section 31 should be disposed on a surface on the side opposite to the step plate 2 side of the handle 3, For example, the power-on operation section 31 may be disposed on a surface on the side opposite to the step plate 2 side of the first support section 34.

The getting-off button 32 is provided on the grasping section 36. Note that the getting-off button 32 may be disposed in any place in the handle 3, provided that the rider X can easily press down the getting-off button 32 when he/she is on the inverted two-wheeled vehicle 100. For example, the getting-off button 32 may be disposed in a surface on the step plate 2 side of the second support section 35.

The power-off button 33 is disposed on a surface on the step plate 2 side of the handle 3. Specifically, the power-off button 33 is disposed on a surface that is located on the step plate 2 side of the inverted two-wheeled vehicle 100 and located in the upper part of the second support section 35. Note that the power-off button 33 may be disposed in any place in the handle 3, provided that the rider X can easily press down the power-off button 33 when he/she is on the inverted two-wheeled vehicle 100. For example, the power-off button 33 may be disposed in a surface on the step plate 2 side of the grasping section 36.

Figure 4:
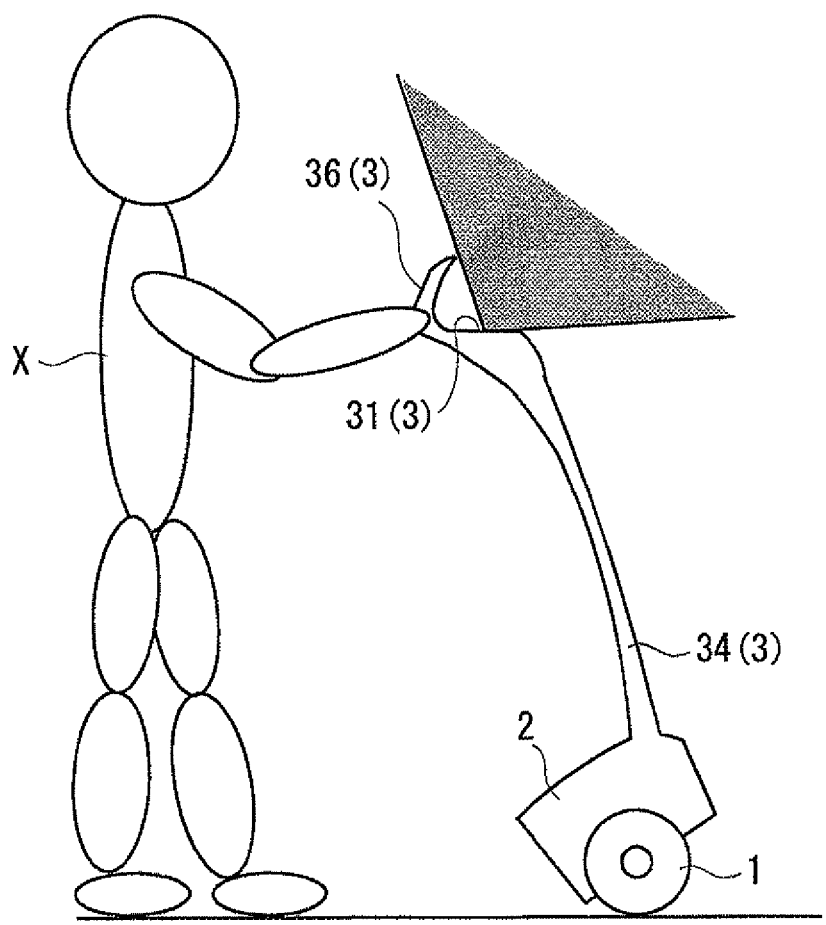
FIG. 4 is a side view showing a range in which a rider can reach a power-on operation section disposed in the handle when the inverted two-wheeled vehicle according to the first exemplary embodiment of the present invention is parked.
Figure 5:
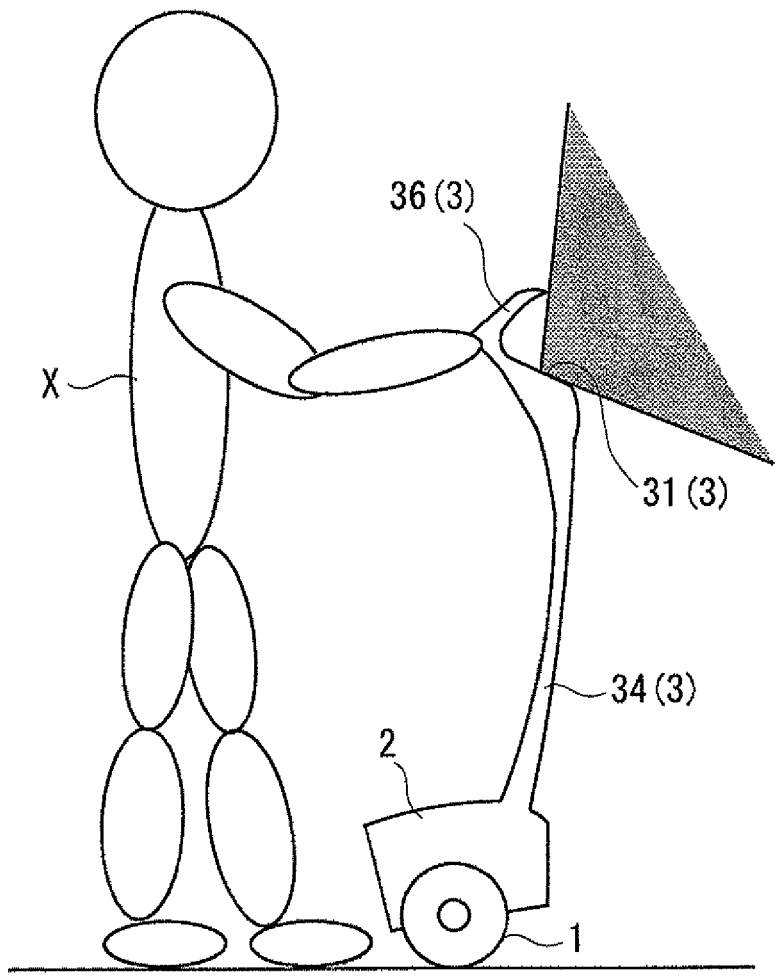
FIG. 5 is a side view showing a range in which a rider can reach the power-on operation section disposed in the handle when the inverted two-wheeled vehicle according to the first exemplary embodiment of the present invention is in a getting-on-ready state.

FIG. 4 shows a range within which the rider X can reach the power-on operation section 31 disposed in the handle 3 when the inverted two-wheeled vehicle 100 is parked. Further, FIG. 5 shows a range within which the rider X can reach the power-on operation section 31 disposed in the handle 3 when the inverted two-wheeled vehicle 100 is in a getting-on-ready state. In each of FIGS. 4 and 5, the range within which the rider X can reach the power-on operation section 31 is indicated by hatching. As shown in FIGS. 4 and 5, the inverted two-wheeled vehicle 100 is configured so that the rider X cannot easily reach the power-on operation section 31 from the step plate 2 side of the handle 3 because the grasping section 36 serves as an obstacle to him/her operating the power-on operation section 31.

Figure 6:
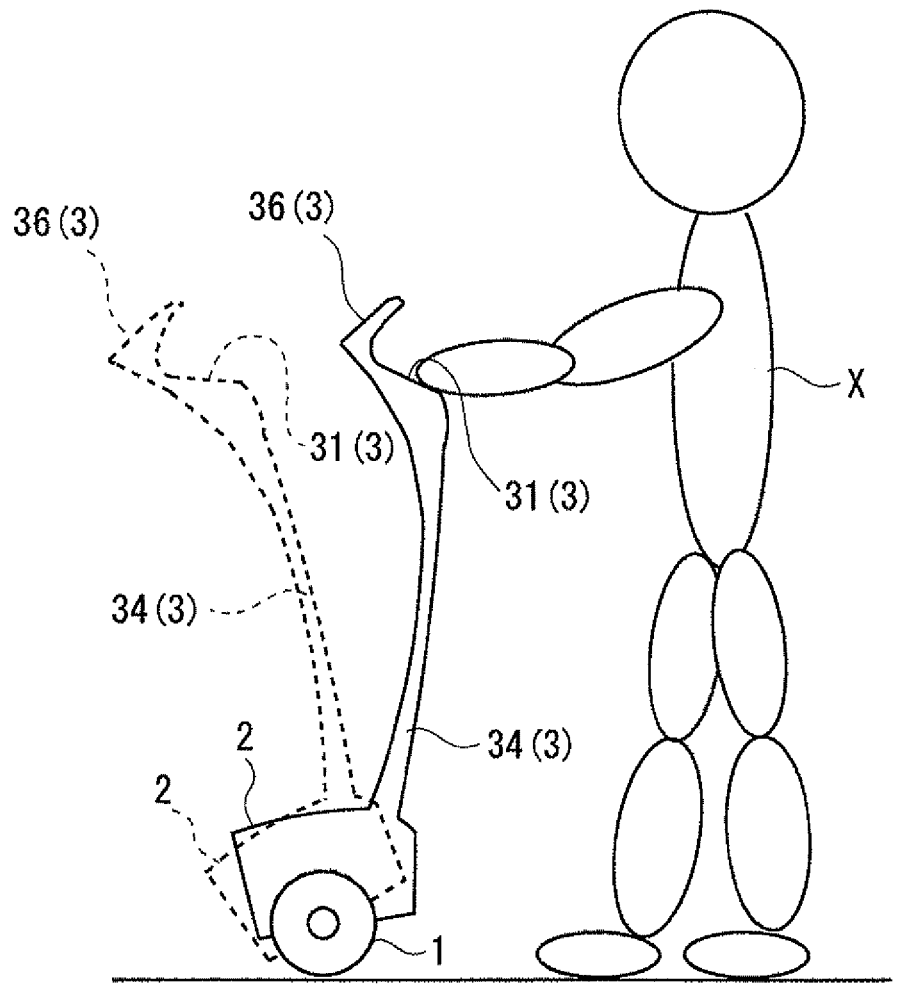
FIG. 6 is a side view showing an aspect where a rider is getting on the inverted two-wheeled vehicle according to the first exemplary embodiment of the present invention.

Therefore, as shown in FIG. 6, the rider X first unlocks the electronic lock of the inverted two-wheeled vehicle 100 and thereby powers on the inverted two-wheeled vehicle 100 by operating the power-on operation section 31 from the side opposite to the step plate 2 side of the handle 3. After that, the rider X moves to the step plate 2 side of the inverted two-wheeled vehicle 100 and gets on the inverted two-wheeled vehicle 100 from the step plate 2 side. As a result, it is possible to prevent the rider X from getting on the inverted two-wheeled vehicle 100 before the inversion control of the inverted two-wheeled vehicle 100 is started. Therefore, it is possible to prevent the inverted two-wheeled vehicle 100 from making any movement that is not intended by the rider X without having to perform any complicated control.

Second Exemplary Embodiment

An inverted two-wheeled vehicle (vehicle) 200 according to a second exemplary embodiment is different from the inverted two-wheeled vehicle 100 according to the first exemplary embodiment only in the shape of a grasping section 36A of the handle 3. Therefore, the same symbols are assigned to the same components/structures and their explanations are omitted.

Figure 7:
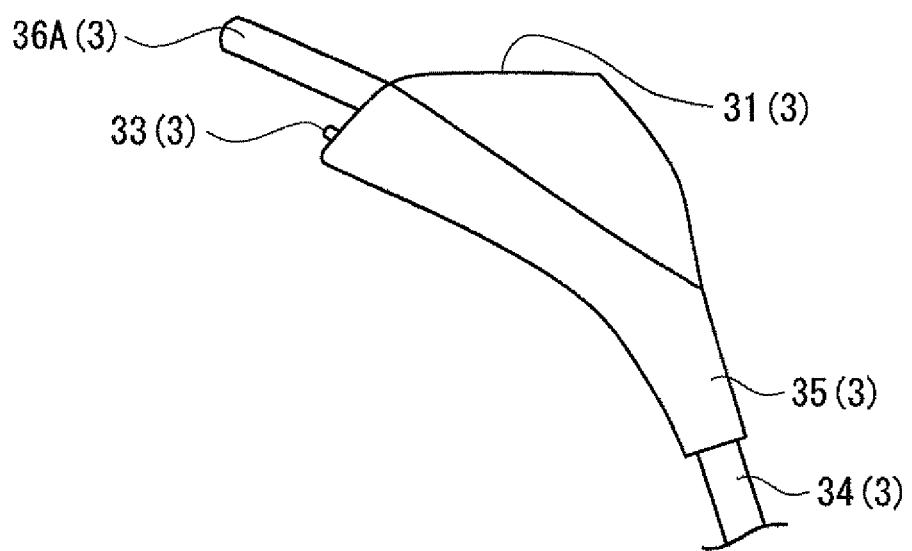
FIG. 7 is a side view showing a handle of an inverted two-wheeled vehicle according to a second exemplary embodiment of the present invention.

FIG. 7 is a magnified view of the upper part of the handle 3 of the inverted two-wheeled vehicle 200, As shown in FIG. 7, the grasping section 36A extends from the upper part of the second support section 35 toward above the inverted two-wheeled vehicle 200. Further, the grasping section 36A has a roughly a U-shape.

Figure 8:
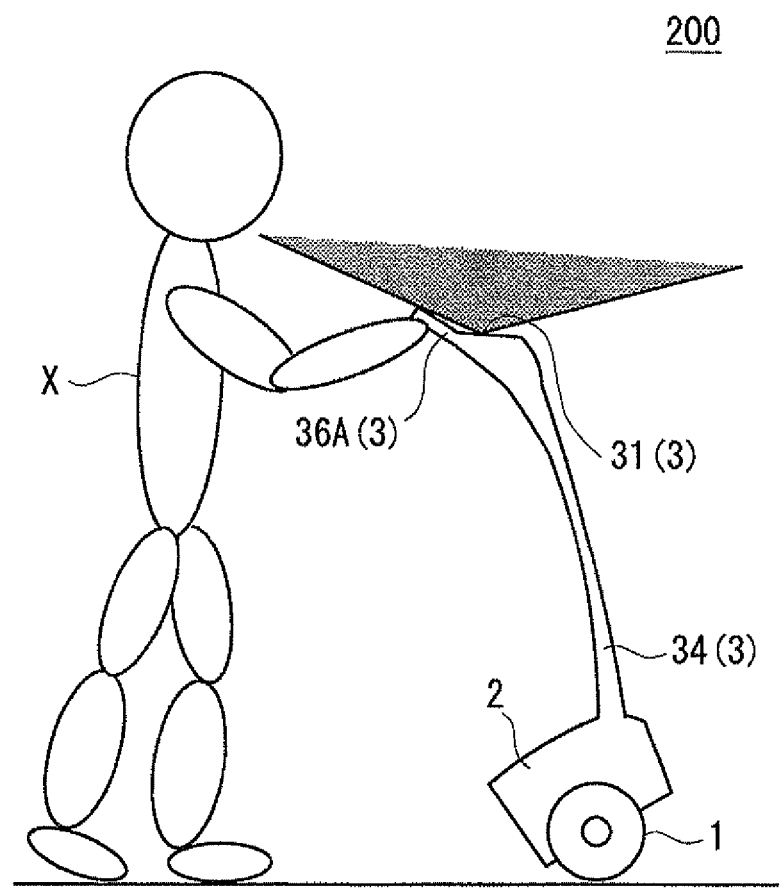
FIG. 8 is a side view showing a range in which a rider can reach a power-on operation section disposed in the handle when the inverted two-wheeled vehicle according to the second exemplary embodiment of the present invention is parked.
Figure 9:
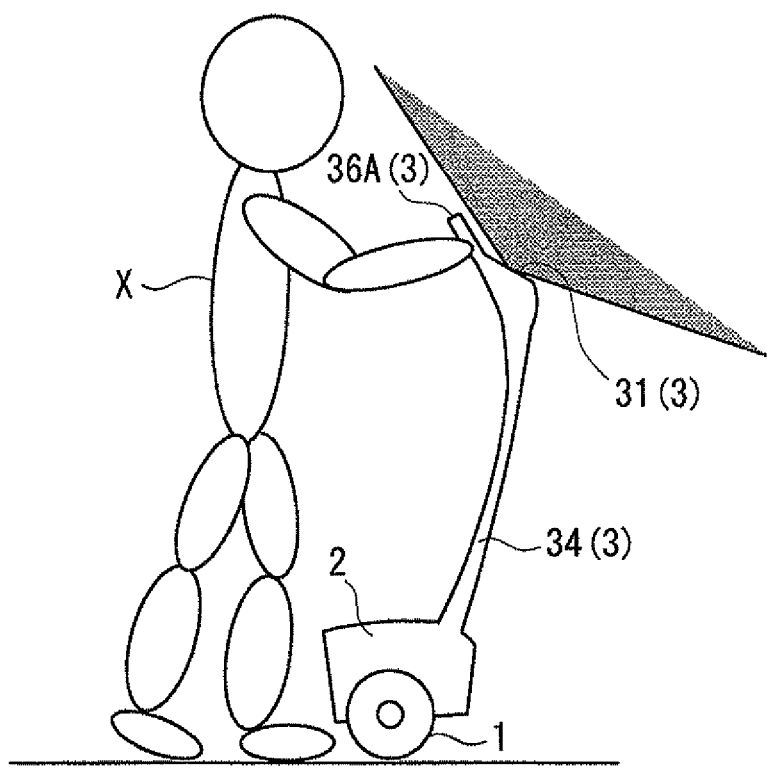
FIG. 9 is a side view showing a range in which a rider can reach the power-on operation section disposed in the handle when the inverted two-wheeled vehicle according to the second exemplary embodiment of the present invention is in a getting-on-ready state.

FIG. 8 shows a range within which the rider X can reach the power-on operation section 31 disposed in the handle 3 when the inverted two-wheeled vehicle 200 is parked. Further, FIG. 9 shows a range within which the rider X can reach the power-on operation section 31 disposed in the handle 3 when the inverted two-wheeled vehicle 200 is in a getting-on-ready state. In each of FIGS. 8 and 9, the range within which the rider X can reach the power-on operation section 31 is indicated by hatching.

As shown in FIGS. 8 and 9, the inverted two-wheeled vehicle 200 is configured so that the rider X cannot easily reach the power-on operation section 31 from the step plate 2 side of the handle 3 because the grasping section 36A serves as an obstacle to the rider X operating the power-on operation section 31. In particular, when the inverted two-wheeled vehicle 200 is in a getting-on-ready state, it is more difficult for the rider X to reach the power-on operation section 31 from the step plate 2 side of the handle 3 than when the inverted two-wheeled vehicle 200 is parked.

Third Exemplary Embodiment

An inverted two-wheeled vehicle (vehicle) 300 according to a third exemplary embodiment is different from the inverted two-wheeled vehicle 100 according to the first exemplary embodiment only in that a power-on button (starting operation section) 31A is provided in place of the power-on operation section 31. Therefore, the same symbols are assigned to the same components/structures and their explanations are omitted.

Figure 10:
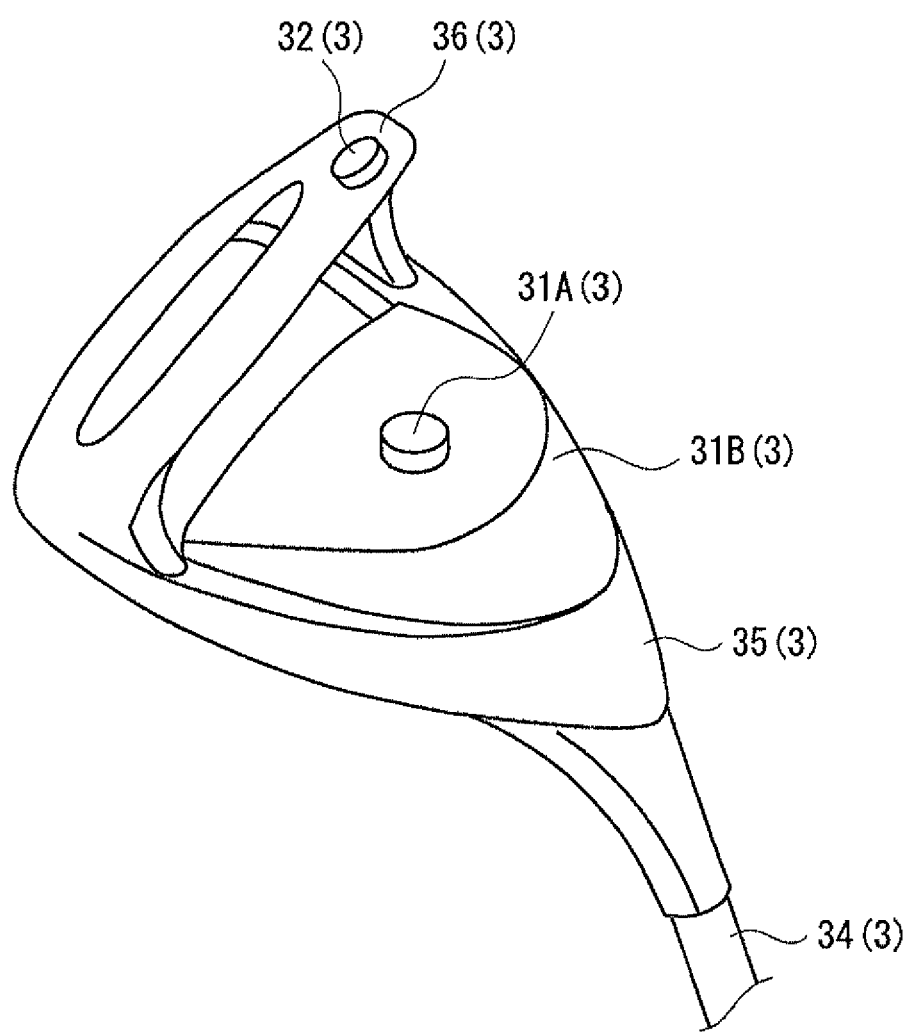
FIG. 10 is a perspective view showing a handle of an inverted two-wheeled vehicle according to a third exemplary embodiment of the present invention.
Figure 11:
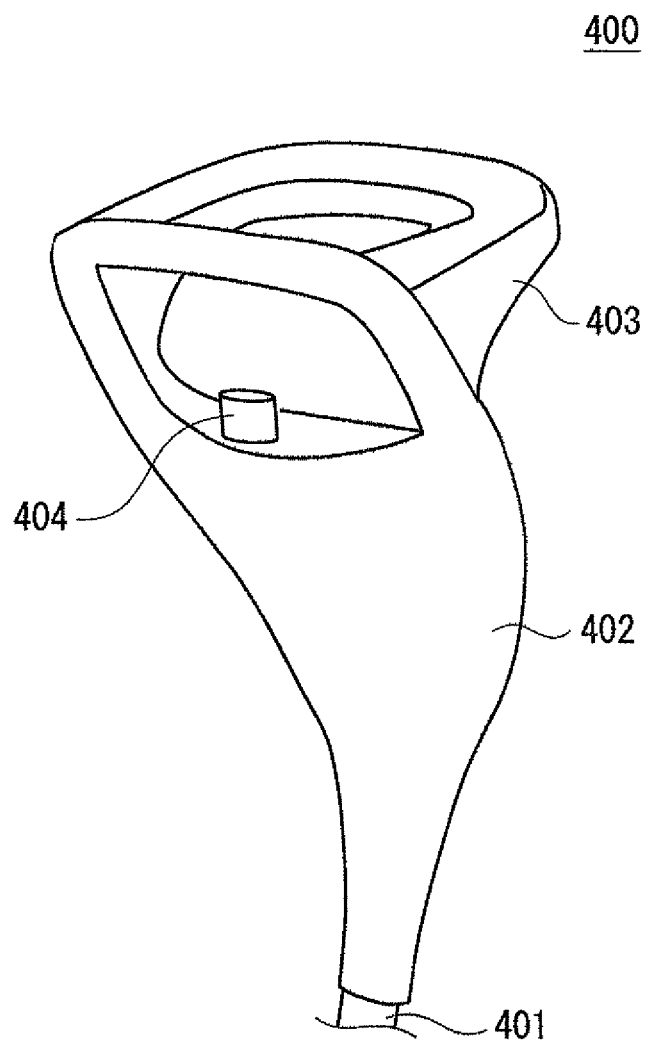
FIG. 11 is a perspective view showing an upper part of a handle of an inverted two-wheeled vehicle in related art.
Figure 12:
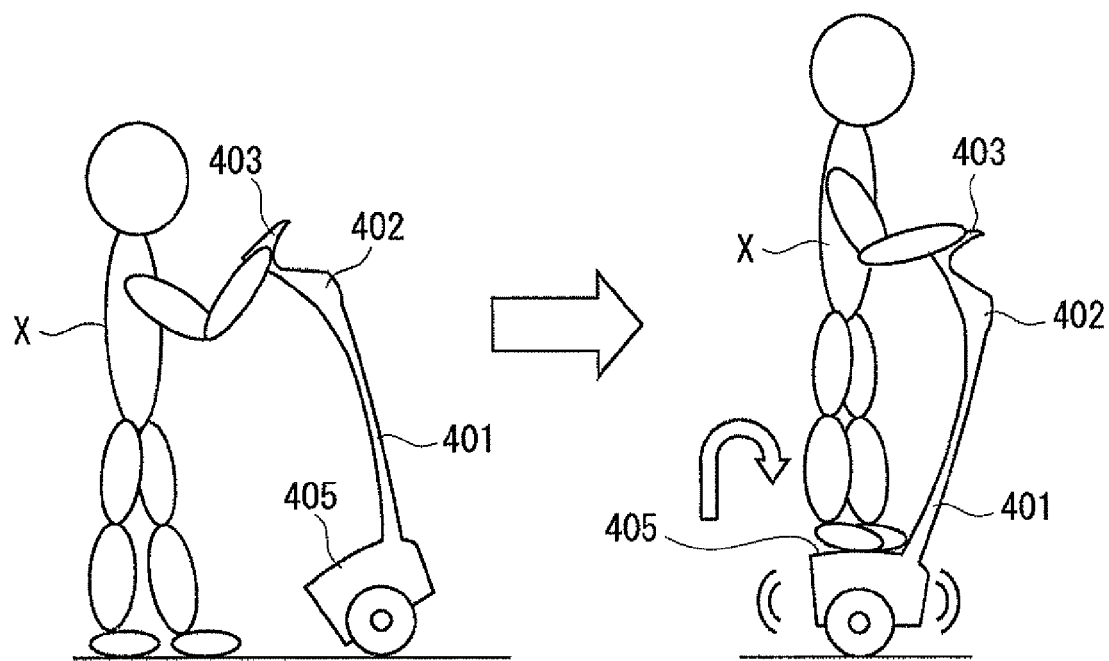
FIG. 12 is a side view for explaining an aspect where a rider is getting on the inverted two-wheeled vehicle in the related art.
Figure 13:
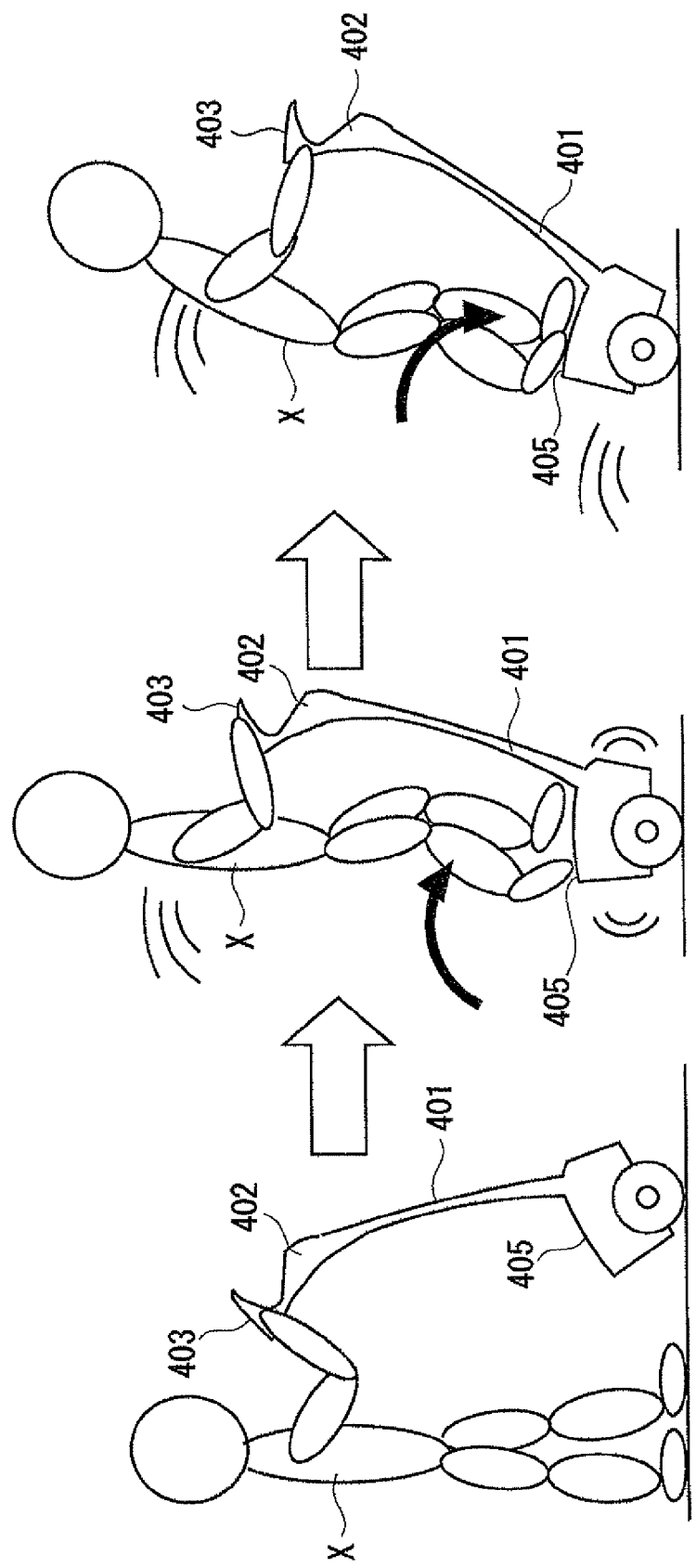
FIG. 13 is a side view for explaining an aspect where a rider presses down a push button for turning on the power while jumping onto the inverted two-wheeled vehicle in the related art.
Figure 14:
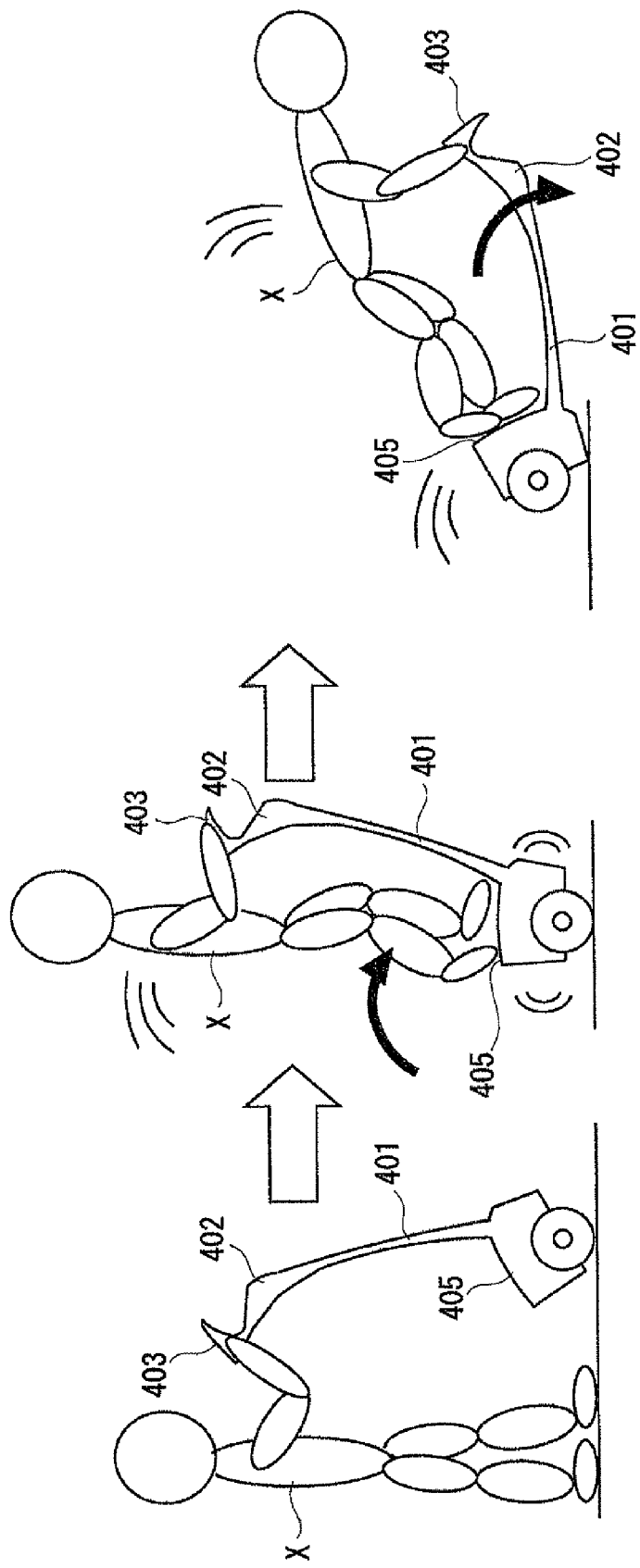
FIG. 14 is a side view for explaining another aspect where a rider presses down the push button for turning on the power while jumping onto the inverted two-wheeled vehicle in the related art.

FIG. 10 is a magnified view of the upper part of the handle 3 of the inverted two-wheeled vehicle 300. As shown in FIG. 10, the power-on button 31A is disposed on a surface on the side opposite to the step plate 2 side of the handle 3. Specifically, the power-on button 31A is disposed in the top surface of a pedestal section 31B that is disposed so as to protrude from the second support section 35 downward and toward the front of the inverted two-wheeled vehicle 300 below the grasping section 36. Further, the power-on button 31A is disposed roughly at the center in the width direction of the pedestal section 31B. Further, when a rider X presses down the power-on button 31A, the inverted two-wheeled vehicle 300 is powered on.

Similarly to the inverted two-wheeled vehicle 100, the inverted two-wheeled vehicle 300 is configured so that the rider X cannot easily press down the power-on button 31A from the step plate 2 side of the handle 3 because the grasping section 36 serves as an obstacle to him/her pressing down the power-on button 31A. In particular, since the power-on button 31A is disposed roughly at the center in the width direction of the pedestal section 31B, the power-on button 31A is located far away from both the right and left sides of the grasping section 36. Therefore, when the rider X is on the step plate 2 side of the handle 3, he/she cannot easily press down the power-on button 31A from either the right side or left side of the grasping section 36.

According to the above-explained inverted two-wheeled vehicles 100 to 300 in accordance with the first to third exemplary embodiments of the present invention, the power-on operation section 31 or the power-on button 31A, which is used to power on the inverted two-wheeled vehicle 100, 200 or 300, is provided on a surface on the side opposite to the step plate 2 side of the handle 3. Therefore, the rider X cannot easily operate the power-on operation section 31 or the power-on button 31A from the step plate 2 side. Consequently, the rider X first powers on the inverted two-wheeled vehicle 100, 200 or 300 by operating the power-on operation section 31 or the power-on button 31A from the side opposite to the step plate 2 side of the inverted two-wheeled vehicle 100, 200 or 300. Then, after that the rider X moves to the step plate 2 side of the inverted two-wheeled vehicle 100, 200 or 300 and gets on the inverted two-wheeled vehicle 100, 200 or 300 from the step plate 2 side. As a result, it is possible to prevent the rider X from getting on the inverted two-wheeled vehicle 100, 200 or 300 before the inversion control of the inverted two-wheeled vehicle 100, 200 or 300 is started. Therefore, it is possible to prevent the inverted two-wheeled vehicle 100, 200 or 300 from making any movement that is not intended by the rider X without performing any complicated control.

Further, the shape of the grasping section 36A of the handle 3 of the inverted two-wheeled vehicle 200 according to the second exemplary embodiment is different from that of the grasping section 36 of the handle 3 of the inverted two-wheeled vehicle 100 according to the first exemplary embodiment, the inverted two-wheeled vehicle 200 according to the second exemplary embodiment can provide advantageous effects similar to those of the inverted two-wheeled vehicle 100 according to the first exemplary embodiment. That is, by disposing the power-on operation section 31 or the power-on button 31A, which is used to power on the inverted two-wheeled vehicle 100, 200 or 300, on a surface in any place located on the side opposite to the step plate 2 side of the handle 3 except for the grasping section 36 or 36A, the advantageous effects of the present invention can be achieved irrespective of the shape of the grasping section 36 or 36A.

Further, since the power-off button 33 is disposed on the step plate 2 side of the handle 3 in each of the inverted two-wheeled vehicle 100 to 300 according to the first to third exemplary embodiments, the power-off button 33 can be easily pressed down by a rider X when he/she gets off the inverted two-wheeled vehicle 100, 200 or 300. Therefore, the rider X does not need to move to the front side of the inverted two-wheeled vehicle 100, 200 or 300 to power off the inverted two-wheeled vehicle after getting off the inverted two-wheeled vehicle. Accordingly, the rider X can power off the inverted two-wheeled vehicle 100, 200 or 300 more easily in comparison to the case where the operation section for powering on or off the inverted two-wheeled vehicle is disposed in a surface on the side opposite to the step plate side of the handle.

Further, in the inverted two-wheeled vehicles 100 and 200 according to the first and second exemplary embodiments, the power-on operation section 31 is an electronic lock authentication device capable of communicating with the wireless communication terminal possessed by a rider X by short-range radio communication. Therefore, the power-on operation section 31 unlocks the electronic lock when authentication data acquired from the wireless communication terminal matches authentication data stored in the power-on operation section 31. In this way, only the rider X who possesses the wireless communication terminal storing the same authentication data as the authentication data registered in the inverted two-wheeled vehicle 100 or 200 can ride on the inverted two-wheeled vehicle 100 or 200. Therefore, it is possible to prevent unauthorized people from riding on the inverted two-wheeled vehicle 100 or 200.

Note that the present invention is not limited to the above-described exemplary embodiments, and various modifications can be made as appropriate without departing from the spirit of the present invention. For example, the starting operation section for instructing the control apparatus of the inverted two-wheeled vehicle to at least start the inversion control may be a trigger, a key switch, a non-contact sensor such as an infrared sensor, or the like. Further, the grasping section 36 may be disposed so as to extend from the upper part of the second support section 35 upward and toward the back of the inverted two-wheeled vehicle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A vehicle comprising a riding section on which a rider puts his/her feet to get on the vehicle, and a handle that extends upward from a front of the riding section and is grasped by the rider, the vehicle being configured to move by performing inversion control, wherein
the vehicle further comprises a starting operation section for instructing the vehicle to at least start the inversion control, the starting operation section being disposed on a surface on the side opposite to a riding section side of the handle.

2. The vehicle according to claim 1, further comprising a stopping operation section for instructing the vehicle to at least stop the inversion control, the stopping operation section being disposed on a surface on the riding section side of the handle.

3. The vehicle according to claim 1, wherein
the handle comprises a support section extending from the front of the riding section, and a grasping section that extends upward from an upper part of the support section and is grasped by the rider, and
the starting operation section is disposed on a surface that is located on the side opposite to the riding section side of the support section and located below the grasping section.

4. The vehicle according to claim 3, wherein
the support section comprises a first support section extending upward from the front of the riding section, and a second support section extending from a top of the first support section upward and toward the back of the vehicle, the first support section being a stick-like member, the second support section having a width wider than that of the first support section,
the grasping section protrudes from an upper part of the second support section toward above the vehicle, and
the starting operation section is disposed on a surface on the side opposite to the riding section side of the second support section.

5. The vehicle according to claim 1, wherein the starting operation section is an electronic lock authentication device capable of communicating with a wireless communication terminal possessed by the rider by short-range radio communication.

<p style="text-align:center">* * * * *</p>